Figure 1:
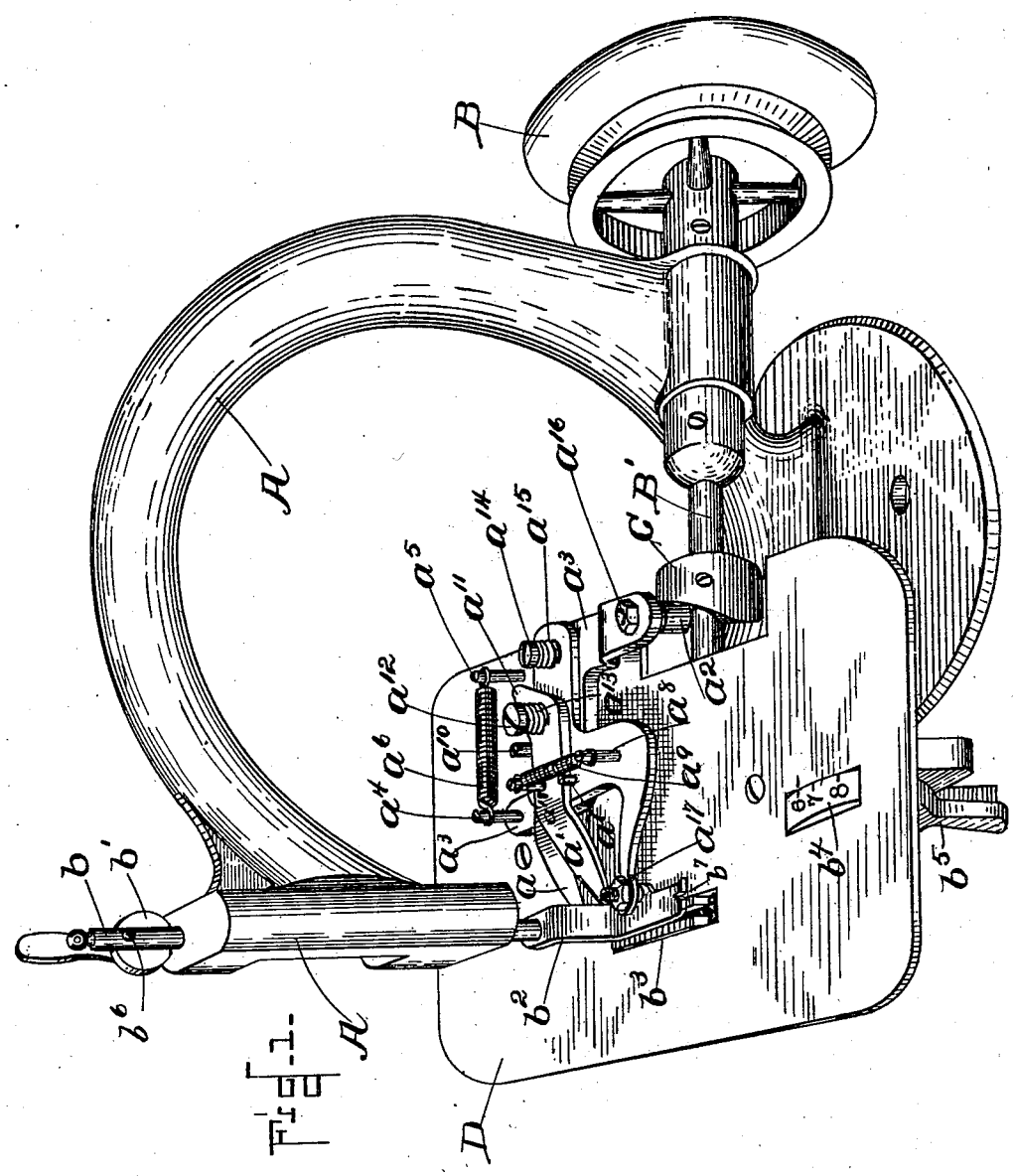

No. 724,468. PATENTED APR. 7, 1903.
F. L. HARMON.
BUTTONHOLE FINISHING MACHINE.
APPLICATION FILED JAN. 28, 1898.
NO MODEL. 2 SHEETS—SHEET 1.

Witnesses
Charles B. Crocker.
Arthur B. Averill

Inventor:
Frank L. Harmon.

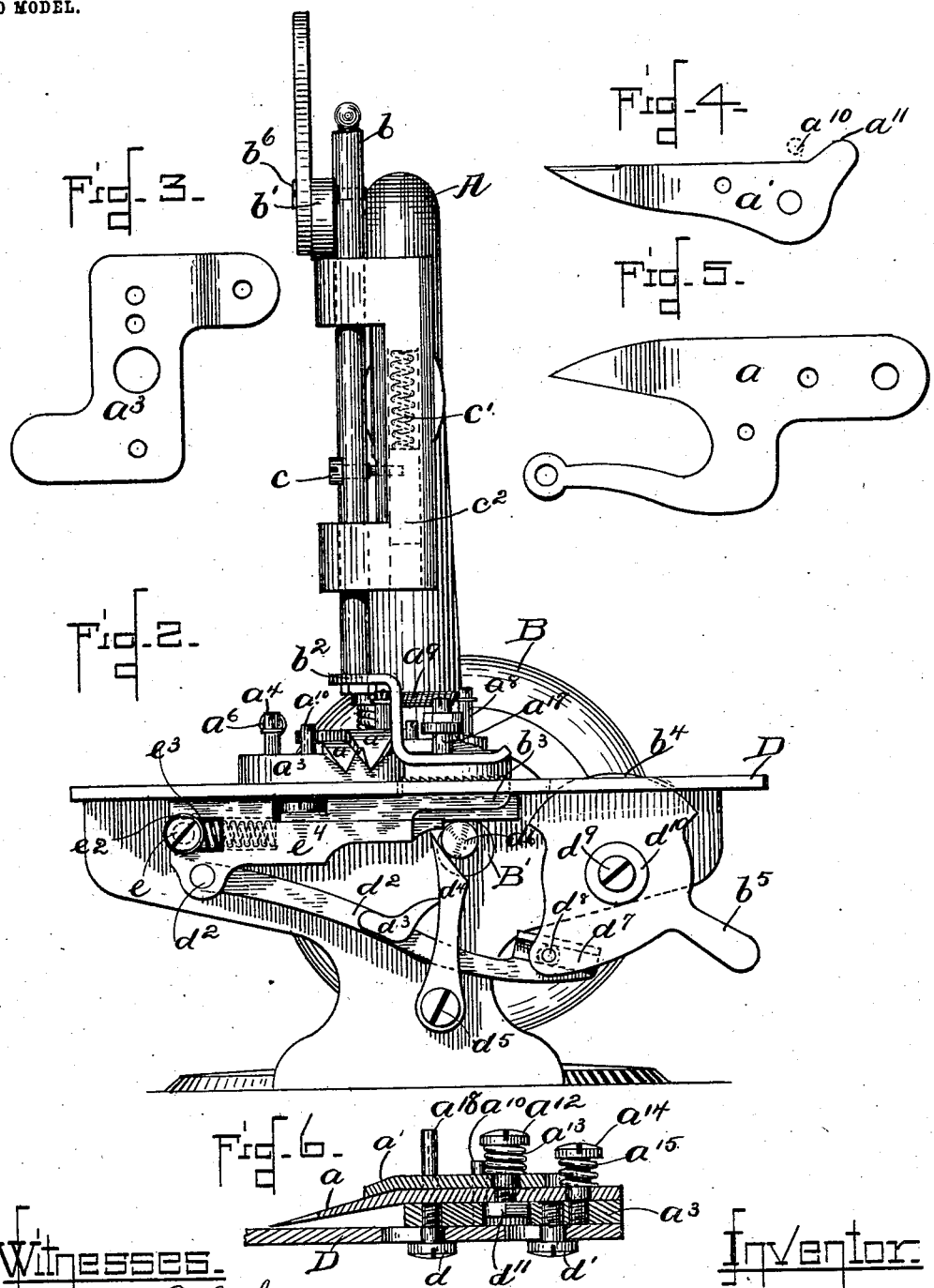

UNITED STATES PATENT OFFICE.

FRANK L. HARMON, OF BEVERLY, MASSACHUSETTS.

BUTTONHOLE-FINISHING MACHINE.

SPECIFICATION forming part of Letters Patent No. 724,468, dated April 7, 1903.

Application filed January 28, 1898. Serial No. 668,363. (No model.)

*To all whom it may concern:*

Be it known that I, FRANK L. HARMON, of Beverly, in the county of Essex and Commonwealth of Massachusetts, have invented a new and useful Trimming-Machine, of which the following is a specification.

This invention is specifically stated as being embodied in a novel combination of devices comprising a trimming device and also comprising a novel mechanism whereupon the trimming device is vibrated back and forth, entering between and passing out from between a material and a line of thrums secured to one side of the material at intervals and loose between the intervals, and is caused to cut the line of thrums off from the material, and also a mechanism whereupon the material is moved and the line of thrums is carried in the direction in which the line of thrums extends while the line of thrums is being cut off, all united so as to coöperate to produce a unitary function and result by their united action. The trimming device employed is of old construction and is a pair of common shears comprising two shear-blades and a spring whereupon the shear-blades are held together with a yielding pressure. No novelty whatever resides in said shears, the same being substantially a duplicate of a pair of common sheep-shears of great antiquity, which also comprises two shear-blades and a spring whereupon they are also held together with a yielding pressure. The mechanism whereupon the material is moved and the thrums carried is also old, the same being substantially a part of the mechanism of a Willcox & Gibbs sewing-machine. The shears or cutting device being old and the part of the mechanism of the Willcox & Gibbs sewing-machine being also old when regarded separately disclose no novelty, but when they are combined in the combination of devices forming the organization of the novel machine made the subject of this invention they are parts of the novel combination and the mechanism thereof.

Having revealed just what this invention consists of in as specific and unmistakable manner as possible, attention is now called to the brief and detailed description of the accompanying drawings in the full disclosure of the construction and combination of the parts of this novel machine, in which other novel features will appear.

In the accompanying drawings, Figure 1 is a perspective view of this trimming-machine, and Fig. 2 is an end elevation of the same. Fig. 3 shows a block upon which a pair of shears are to be movably mounted. Figs. 4 and 5 show the blades of a pair of shears to be mounted upon the block shown in Fig. 3; and Fig. 6 shows in section the shear-blades assembled and mounted upon the block shown in Fig. 3, which block is shown in section in Fig. 6 as movably mounted upon a work-support.

The work-support D is shown in full in Figs. 1 and 2. A section of the work-support D is shown in Fig. 6. In Fig. 3 the block $a^3$ is shown. In Fig. 6 the block $a^3$ is shown in section, and the shears are shown in section, movably mounted thereon, and the block $a^3$ is shown as movably secured to said work-support, so that said block may be easily moved back and forth upon said work-support, thereby moving the screws $d$ and $d'$, rigidly secured in said block, in the section of the slots shown in said work-support. It will be understood that the devices are shown in section in Fig. 6 to show how that the block $a^3$ (shown in Fig. 3) is movably mounted upon the work-support D. (Shown in Figs. 1 and 2.) It will be understood by Fig. 6 that as the block $a^3$ may be easily moved back and forth upon the work-support D the shears mounted upon the block $a^3$ may be bodily carried by the block $a^3$ back and forth when the block $a^3$ is moved back and forth. The shear-blade $a$ (shown in Fig. 5) is shown in section in Fig. 6 mounted upon the block $a^3$. A hole is shown in the large end of the shear-blade $a$ in Fig. 5. The screw $a^{14}$, (shown in Fig. 6,) passed through the spring $a^{15}$, fitted loosely in said hole in said shear-blade $a$, is firmly secured into the uppermost of the two small holes shown in the block $a^3$ in Fig. 3. The shear-blade $a'$ is shown in Fig. 4. Said shear-blade $a'$ is also shown in Fig. 6 in section mounted upon the shear-blade $a$. (Shown in section in Fig. 6.) A hole is shown near the end of the shear-blade $a'$ in Fig. 4. The screw $a^{12}$, (shown in Fig. 6,) passed through the spring $a^{13}$ and fitted loosely in said hole in said shear-blade $a'$, is firmly secured in and passed through the second hole (shown in Fig. 5) from the large rounded end of the shear-blade $a$. The screw $a^{12}$ is secured in said hole in said shear-blade $a$ by the check-nut $d^{11}$ on the screw $a^{12}$. The check-nut $d^{11}$, by which the screw $a^{12}$ is secured in said hole, is shown inserted into the large hole. (Shown in the section of the block $a^3$ in Fig. 6 and shown in the center of the block $a^3$ in Fig. 3.) The check-nut $d^{11}$ being about as large as the large hole prevents a lateral movement of the shears upon the block $a^3$. The spring $a^{15}$ on the screw $a^{14}$ is to allow the points of the shear-blades $a$ and $a'$ (shown in section in Fig. 6) to be mechanically raised from the top side of the work-support D against the stress of the spring $a^{15}$ into a proper elevation to trim thrums off from a material regardless of the thickness of the material or into the position in which they are shown in Fig. 2. The spring $a^{13}$ upon the screw $a^{12}$ is to hold the cutting edges of the shear-blades $a$ and $a'$ together yieldingly, so that they may cut properly.

Having shown by Fig. 6 that the block $a^3$ (shown in Fig. 3) is movably secured to the work-support D, (shown in Figs. 1 and 2,) so that the block may be moved back and forth upon said work-support, thereby moving the screws $d$ and $d'$ (shown in Fig. 6) in the slots in said work-support, thereby carrying the shears back and forth bodily by the block $a^3$, and how that the shears are movably mounted upon the block $a^3$ in such a manner that the points of the shears may be mechanically raised from the top of the work-support D, and that the shears are prevented from being moved laterally upon the block $a^3$, and that the cutting edges of the shear-blades are held together yieldingly, so that they may cut properly, attention is now called to these devices. (Shown in Figs. 1 and 2.) In Figs. 1 and 2 the shears comprising the shear-blades $a$ and $a'$ are shown mounted upon the block $a^3$, as shown in Fig. 6, and the block $a^3$ is shown movably secured to the work-support D, also as shown in Fig. 6. In Fig. 2 the points of the shear-blades $a$ and $a'$ are shown in a raised position against the stress of the spring $a^{15}$. (Shown in Figs. 6 and 1.) In Fig. 1 the shear-blade $a$ is shown projecting over the presser-foot $b^2$, and in the end of the shear-blade $a$ is shown an adjusting-screw $a^{17}$, which is forced against the presser-foot $b^2$ on account of the spring $a^{15}$ on the screw $a^{14}$. By adjusting the adjusting-screw $a^{17}$ by hand the points of the shears may be raised against the stress of the spring $a^{15}$ to about one sixty-fourth of an inch above the bottom of the presser-foot $b^2$, and the screw may be secured in the shear-blade $a$ by the check-nut on the screw. In Fig. 2 the presser-foot $b^2$, the presser-bar $b$, secured thereto, the screw $c$, fast in the presser-bar $b$, and the block $c^2$, (shown by dotted lines,) fast to said screw and in a hole (shown by dotted lines) in the end of the arm A, are shown held in a raised position against the stress of the spring $c'$ in said hole above said block on account of the cam-lever $b'$, resting on the arm A and movably secured to the screw $b^6$, fast in the presser-bar $b$. Before the material with the thrums thereon is moved in practice by the feeding device $b^3$ (shown in Figs. 1 and 2) the cam-lever $b'$ (shown in Figs. 1 and 2) is pushed over by the operator, allowing the spring $c'$ (shown in Fig. 2) to cause the presser-foot $b^2$ to be forced down against the feeding device $b^3$, whereupon the spring $a^{15}$ upon the screw $a^{14}$ causes the points of the shear-blades $a$ and $a'$ to follow the presser-foot downward. In Figs. 1 and 2 the feeding device $b^3$ is shown in the position that it is in in practice just after the material has been moved. In Fig. 1 the cam C is shown in the position that it is in in practice when it is just beginning to cause devices to move forward to cut the thrums off from the material.

The operation of the machine is explained by Figs. 1 and 2, as follows: A material is placed with the thrums up in front of the presser-foot $b^2$ while said presser-foot is down against the feeding device $b^3$, as aforesaid, so that the end of the line of thrums to be cut or trimmed from the material may be fed or moved under the presser-foot $b^2$ at the notch $b^7$ therein on account of the feeding device $b^3$. It matters not about the thickness of the material, for the presser-foot $b^2$ is forced upward by the material while said material is being moved under the presser-foot by the feeding device, and the points of the shear-blades $a$ and $a'$ are automatically raised by the presser-foot, acting against the screw $a^{17}$ in the shear-blade $a$ against the stress of the spring $a^{15}$ on the screw $a^{14}$, into a proper position to shear thrums off from the material regardless of the thickness of the material. The automatic raising of the shear-blades by a device actuated by the material is one of the important novel features of this invention. As will be plain by Fig. 1, the driving-pulley B, the shaft B', and the cam C are turned in practice by turning the driving-pulley, and the cam C forces the roll $a^2$ on the stud $a^{16}$, and the stud $a^{16}$, fast in the block $a^3$, which is movably connected with the work-support D, as described and shown in Fig. 6, and moves the block $a^3$, upon which is mounted the shears comprising the shear-blades $a$ and $a'$, as described, and forces the points of the shears while they are open, as shown in Figs. 1 and 2, between the thrums and the material and across the line in which the thrums are moved, which expands the spring $a^6$, fast to the stud $a^4$ in the block $a^3$ and also fast to the stud $a^5$ in the work-support D, and forces the cam-face $a^{11}$ (shown also in Fig. 4 on the shear-blade $a'$) against the stud $a^{10}$, (shown fast in the work-support D in Figs. 1 and 2, the position of which is shown in Fig. 4,) which forces the cutting edge of the shear-blade $a'$ to shear past the cutting edge of the shear-blade $a$, while the spring $a^{13}$ is holding the cutting edges of the shear-blades together yieldingly to cause them to cut properly and causes the spring $a^9$, fast to the stud $a^{18}$ in the shear-blade $a'$ and also fast to the stud $a^8$ in the shear-blade $a$, to be expanded, whereupon the roll $a^2$ is released by the cam C, whereupon the spring $a^6$ pulls the block $a^3$, with the shears thereon, in the opposite direction and causes the roll $a^2$ to follow the face of the cam C, thus causing the points of the shears to be pulled out from between the thrums, and the material thereby moving the cam-face $a^{11}$ (shown in Fig. 4 on the shear-blade $a'$) away from the stud $a^{10}$, thereby allowing the spring $a^9$ to open the points of the shears as far as the stud $a^7$ (shown in Fig. 1 in the shear-blade $a$) admits or into the position in which said shear-blade is shown in Fig. 1. The moving of the shears or device for cutting the thrums from the material back and forth across the line in which the thrums are moved and between the thrums and the material is also an important novel feature of this invention, and the holding of the shear-blades together yieldingly is an important construction of this invention, but is not in itself novel. On account of rapid rotations of the driving-pulley B the points of the shears are rapidly vibrated back and forth across the line in which the thrums are moved, entering between and passing out from between the thrums and the material, and are caused to cut the thrums while between the thrums and the material as the parts of the material to which the thrums are secured are being carried by or past the points of the shear-blades. Thus the line of thrums while being carried in the direction of the length of the line of thrums by moving the material is trimmed from the material. The feeding mechanism is old; but any old feeding mechanism could be used with the rest of the combinations herein described without invention.

At the left-hand side of Fig. 2 below the work-support D the screw $e$ is shown fast in the frame of the machine. Upon this screw is shown the sleeve $e^2$, which has two sides flattened, so that the slotted end of the feeding-device carrier $e^4$ may slide upon said flattened surfaces and may rock the sleeve upon the screw, but cannot slip sidewise on account of the sides of the sleeve being flattened. Upon the feeding-device carrier $e^4$ the feeding device $b^3$ is secured. Upward motion is imparted to the feeding-device carrier $e^4$ and the feeding device $b^3$, secured thereto, by the eccentric $d^6$ on the shaft B'. This eccentric also moves the lever $d^4$, pivoted on the screw $d^5$, which lever moves the point $d^3$ and the feed-controller $d^2$, secured thereto, which feed-controller is pivoted to the feeding-device carrier $e^4$, which moves the feeding-device carrier $e^4$ and feeding device $b^3$, which moves the material toward the left in Fig. 2, while the teeth of the feeding device are held above the top of the work-support D, which movement causes the feeding-device carrier $e^4$ to compress the spring $e^3$ in the hole in the feeding-device carrier $e^4$ by forcing said spring against the sleeve $e^2$ on the screw $e$, which spring moves the feeding-device carrier $e^4$ and feeding device $b^3$ back to the right, while the feeding-device carrier and feeding device are forced by the spring $e^3$ to follow the eccentric downward. In the end of the feed-controller $d^2$ is shown the slot $d^7$, in which is shown the stud $d^8$, fast to the lever $b^4$, which lever is pivoted to the frame A by the screw $d^9$ and is held in position by the friction-washer $d^{10}$.

To shorten the stroke of the feeding device $b^3$, the lever $b^4$ (shown in Fig. 2) may be raised by lifting the handle $b^5$ thereof by hand, and the feed-controller $d^2$ and the point $d^3$, secured thereto, will thereby be moved nearer to the pivotal screw $d^5$ of the lever $d^4$, where the lever $d^4$ has less movement, by the stud $d^8$, acting in the slot $d^7$ of the feed-controller $d^2$.

Having precisely described this invention, I claim—

1. A trimming-machine comprising the following instrumentalities, viz: a work-support; a presser-foot; means whereupon the presser-foot is movably supported; a spring whereupon the presser-foot is forced yieldingly against one side of a material having thrums thereon; a feeding device; means whereupon the feeding device is movably supported; means whereupon the feeding device is moved against the material to move the material and carry the thrums so that they may be trimmed; a device to be moved back and forth for trimming thrums; means whereupon the device for trimming thrums is movably supported; means whereupon the device for trimming thrums is carried back and forth across the line in which the thrums are carried, and is forced between the thrums and the material, and is forced to trim the thrums near to the material without cutting the material, and is forced out from between the thrums and the material.

2. A trimming-machine comprising the following instrumentalities, viz: a work-support; a presser-foot; means whereupon the presser-foot is movably supported; a spring whereupon the presser-foot is forced yieldingly against one side of a material having thrums thereon; a feeding device; means whereupon the feeding device is movably supported; means whereupon the feeding device is moved against the material to move the material and carry the thrums so that they may be trimmed; a device to be moved back and forth for trimming thrums; means whereupon the device for trimming thrums is movably supported; means whereupon the device for trimming thrums is carried back and forth across the line in which the thrums are carried, and is forced between the thrums and the material, and is forced to trim the thrums near to the material without cutting the material, and is forced out from between the thrums and the material; means whereupon the device for trimming thrums may be automatically elevated on account of the thickness of the material, into a proper elevation to trim thrums near to the material.

3. A trimming-machine comprising the following instrumentalities, viz: a work-support; a presser-foot; means whereupon the presser-foot is movably supported; a spring whereupon the presser-foot is forced yieldingly against one side of a material having thrums thereon; a feeding device; means whereupon the feeding device is movably supported; means whereupon the feeding device is moved against the material to move the material and carry the thrums so that they may be trimmed; a device comprising two shear-blades, to be moved back and forth for trimming thrums; means whereupon the device for trimming thrums is movably supported; means whereupon the device for trimming thrums is carried back and forth across the line in which the thrums are carried, and is forced between the thrums and the material, and is forced to trim the thrums near to the material without cutting the material, and is forced out from between the thrums and the material; means whereupon the device for trimming thrums may be automatically elevated on account of the thickness of the material, into a proper elevation to trim thrums near to the material; means for holding the shear-blades together yieldingly, so that they may cut properly.

4. A trimming-machine comprising the following instrumentalities, viz: a pair of shears comprising two shear-blades; means whereupon the shears are movably supported; means whereupon the shears are automatically moved out of their normal position while the points of the shear-blades are apart, and into a proper position to trim a thrum near to a material without cutting the material; means whereupon the points of the shears may be automatically forced together to trim a thrum; means whereupon the shears may be automatically moved back into their normal position.

5. A trimming-machine comprising the following instrumentalities, viz: a pair of shears comprising two shear-blades; means for holding the shear-blades together yieldingly, so that they may trim properly; means whereupon the shears are movably supported; means whereupon the shears are automatically moved out of their normal position while the points of the shears are apart, and into a position to trim a thrum near to a material without cutting the material; means whereupon the points of the shears may be automatically forced together to trim a thrum; means whereupon the shears may be automatically moved back into their normal position.

6. A trimming-machine comprising the following instrumentalities, viz: a pair of shears comprising two shear-blades; means whereupon the shears are movably supported; means whereupon the shears may be held on account of the thickness of the material, into a proper elevation to trim a thrum near to the material without cutting the material; means whereupon the shears may be automatically moved out of their normal position while the points of the shear-blades are apart, and into a proper position to trim a thrum near to the material; means whereupon the points of the shears may be automatically forced together to trim a thrum; means whereupon the shears may be automatically moved back into their normal position.

7. A trimming-machine comprising the following instrumentalities, viz: a pair of shears comprising two shear-blades; means for holding the shear-blades together yieldingly, so that they may trim properly; means whereupon the shears are movably supported; means whereupon the shears may be held on account of the thickness of the material, into a proper elevation to trim a thrum near to the material without cutting the material; means whereupon the shears may be automatically moved out of their normal position while the points of the shear-blades are apart, and into a proper position to trim a thrum near to the material; means whereupon the points of the shears may be automatically forced together to trim a thrum; means whereupon the shears may be automatically moved back into their normal position.

8. A trimming-machine comprising the following instrumentalities, viz: a pair of shears adapted to trim a thrum and adapted to be automatically operated; means whereupon a material may be moved to carry thrums secured to said material toward said shears; means whereupon said shears may be automatically operated.

FRANK L. HARMON.

Witnesses:
ARTHUR L. AVERILL,
WILLIAM H. HUNT.